United States Patent [19]

Lawless et al.

[11] Patent Number: 4,971,516

[45] Date of Patent: Nov. 20, 1990

[54] SURGE CONTROL IN COMPRESSORS

[75] Inventors: Brian S. Lawless, Baton Rouge, La.; John E. Stickel, Randolph, N.J.

[73] Assignee: Exxon Research & Engineering Company, Florham Park, N.J.

[21] Appl. No.: 391,673

[22] Filed: Aug. 7, 1989

Related U.S. Application Data

[63] Continuation of Ser. No. 190,790, May 4, 1988, abandoned.

[51] Int. Cl.$^5$ .............................................. F04D 27/02
[52] U.S. Cl. ......................................... 415/1; 415/11; 415/17; 417/282
[58] Field of Search ................... 415/1, 11, 13, 15, 16, 415/17, 26, 27, 30, 36, 37, 39, 40, 43, 118; 417/282, 293, 294; 73/24

[56] References Cited

U.S. PATENT DOCUMENTS

| | | | |
|---|---|---|---|
| 3,292,846 | 12/1966 | Harper et al. | 415/11 X |
| 3,876,326 | 4/1975 | Weitz | 415/17 |
| 3,963,367 | 6/1976 | Stalker et al. | 415/17 |
| 4,139,328 | 2/1979 | Kuper et al. | 415/1 |
| 4,156,578 | 5/1979 | Agar et al. | 415/1 |
| 4,164,035 | 8/1979 | Glennon et al. | 415/39 X |
| 4,205,941 | 6/1980 | Fradin | 415/1 |
| 4,230,437 | 10/1980 | Bellinger et al. | 415/37 X |
| 4,355,948 | 10/1982 | Kountz et al. | 415/1 |
| 4,464,720 | 8/1984 | Agarwal | 415/1 X |
| 4,493,608 | 1/1985 | Paul | 415/11 |
| 4,596,133 | 6/1986 | Smalling et al. | 73/24 |

FOREIGN PATENT DOCUMENTS 700687 12/1979 U.S.S.R. ................... 415/27

Primary Examiner—Edward K. Look
Assistant Examiner—Hoang Nguyen
Attorney, Agent, or Firm—lew Proctor; Chris P. Konkol

[57] ABSTRACT

Method and apparatus for operating compressors to avoid surges. The compressor is controlled by direct measurement of the rate of volumetric flow, Q, of gas through the compressor via the use of an acoustic flow meter, or other sonic velocity measuring device in combination with a standard flow meter and the measurement of the speed, N, of the compressor. The Q/N ratio is calculated electronically and output to a controller which, through a control circuit, operates a recycle valve in a by pass line leading from the discharge side to the suction side of the compressor. The Q/N ratio measured by the controller at compressor operating conditions is compared with a Q/N ratio at which surge will occur. When the measured Q/N ratio is less than the Q/N ratio at surge, the recycle valve will open and flow gas from the discharge side to the suction side of the compressor to avoid surge flow in the compressor.

10 Claims, 3 Drawing Sheets

SURGE CONTROL IN COMPRESSORS

This application is a continuation-in-part of application Ser. No. 190,790, filed May 4, 1988, now abandoned.

FIELD OF THE INVENTION

This invention relates to a method, and apparatus for avoiding surge flow in compressors. In a preferred embodiment, it relates to the use of an acoustic flow meter which can be used to directly measure the rate of volumetric gas flow in a compressor which, coupled with compressor speed, can generate a signal useful for controlling surge.

BACKGROUND AND PROBLEMS

Compressors are widely used worldwide in industrial applications to compress gases. Compressor surge is a phenomenon which occurs in compressors at low volumetric flow rates, and hence limits the minimum capacity of a given compressor. In the operation of a compressor, as the system resistance is increased, the head generated by the compressor increases to overcome this resistance. As system pressure increases, less flow can pass through the compressor, and this will continue up to the maximum head capacity of the compressor. In a characteristic head (H) vs. flow (Q) curve, or head/flow for a given compressor, there can thus be defined a limit in the minimum flow region known as "Surge Flow" or "Surge Point." The head increases with decreasing flow defining a basic slope. Below the surge limit the compressor head/flow curve takes a reverse slope. At this condition, the system back pressure exceeds that at which the compressor is capable of delivering, this causing a momentary backflow condition. At this point in time however system resistance decreases, this causing the back pressure to drop, enabling the compressor to deliver at higher flow than when the surge began. If the opposition to flow downstream of the compressor is unchanged, operation again follows back along the peak head/flow curve until peak head delivery is again readied, this producing the cyclic action known as surge. Thus, during surge, the pressure developed by the compressor can drop momentarily and reach a level where flow actually reverses direction. Although surge energy varies between one compressor and another, considerable damage can be done to a compressor if it is operated in this regime due to vibration, noise, shaft axial movement and overheating which can produce mechanical damage. Ideally however, during periods of reduced flow rates, it is desirable to operate a compressor on the head/flow curve above but as nearly as possible to the surge limit to maximize compressor efficiency, minimize recycle, and thus reduce operating costs.

In operation, to prevent a compressor from operating in surge, some form of control or anti-surge protection device is required. Typically, e.g., the surge control device can be a low flow vent, or a recycle line set to open at some flow higher than surge to return compressed gas from the discharge side to the suction side of the compressor, the device being set to provide a safety margin 10-20% above surge flow to protect against errors in calculated flow rates due to variations caused by changing gas conditions, e.g., gas molecular weight, pressure, temperature, etc., on the head/flow curve at any given operating speed. This safety margin is required to protect the compressor from surge flow, but the higher the set point above the point of surge flow on the head/flow curve the more recycle or venting is required, this resulting in higher operating costs.

Various means have been employed to monitor various operational parameters of a compressor, and to use these measurements to control the operation of the compressor to avoid surge. On one of the more recent control systems, as described in U.S. Pat. No. 4,156,578 which issued on 05/29/79 to Joram Agar et al, surge is avoided by the measurement across the inlet and discharge side of a compressor of such variables as compressor inlet pressure $P_1$, compressor outlet pressure $P_2$, and the differential pressure p across a throttling member disposed in an inlet duct of the compressor. The values $P_1$ and p are input to a first divider to produce a signal proportional to $p/P_1$ which is input to a computer. The values $P_1$ and $P_2$ are input to a second divider to produce a signal $P_2/P_1$ which is also input to the computer. The computer compares the values of $P_2/P_1$ and $p/P_1$ with preprogrammed information based on parameters whose values depend on the characteristics of the compressor (1) operated at conditions which avoids surging and (2) operated at conditions which will produce surging. When the computer output signal, operated at conditions which avoids surging, is output to a two mode controller the latter will maintain the valve of a by-pass line from the discharge side to the suction side of the compressor closed. Conversely, when the computer output signal to the two mode controller indicates conditions which will produce surge the valve of the by-pass line is opened to pass additional gas to the suction side of the compressor to avoid surging.

In U.S. Pat. No. 4,230,437, which was issued to Robert M. Bellinger et al on 10/28/80, there is also described a compressor surge control for a compressor system wherein gas is recycled via a line from the discharge side to the suction side of a compressor. In this system, the amount of recycled gas is minimized by using a first controller to provide a floating set point for a second controller.

Such antisurge systems, and others have advanced the state of the art, but further improvements are nonetheless needed.

OBJECTS

It is, accordingly, an object of this invention to provide improvements in surge control for a compressor which overcomes many of the principal drawbacks of the prior art.

It is, more particularly, an object of this invention to provide a novel method, and apparatus, for monitoring, controlling and preventing surge in axial and centrifugal flow compressors, or systems employing such compressors.

A further, and more particular object is to provide a novel control method, and apparatus combination for monitoring, controlling and preventing surge utilizing a meter component which continuously, directly and rapidly measures the actual volumetric flow to a compressor, and constantly redefines the point of surge regardless of changes in molecular weight, speed, temperatures and pressures, of the compressed gas such that closer operation to the surge point, or lower "safety margin" is required than is typical, this providing energy savings by minimizing recycle during low flow operation.

THE INVENTION

These objects and others are achieved in accordance with this invention embodying method, and apparatus which includes in part a centrifugal or axial flow compressor, and compressor circuit which includes a gas inlet, gas outlet, gas by pass line connecting said gas inlet and said gas outlet, and recycle valve within said by pass line which can be opened and closed to control the flow of gas from said gas outlet to said gas inlet side of said compressor. A compressor control circuit, which regulates the compressor and compressor circuit, contains a sonic velocity measuring device or, preferably an acoustic flow meter, for determining the volumetric flow, Q, of gas through the compressor, and counter means for monitoring the speed, N, of the compressor which can be input to a controller to generate a Q/N operating value for the compressor. The compressor control circuit further includes a controller or logic system means for the input of the values of Q and N to said controller, and an electronic control circuit associated with said controller for opening said recycle valve when a set point value of Q/N is greater than the actual Q/N, and closing or maintaining in closed condition said valve when the set point value of Q/N is less than the actual Q/N value.

The operation of the compressor is controlled to prevent surging via means which measures the rate of volemtric flow, Q, of gas through the compressor, and the compressor speed, N, the values of which are input to a logic system or controller which, through the use of an electronic control circuit, opens the regulator valve when a set point Q/N ratio is not exceeded, and closes the regulator valve, or maintains the regulator valve in a closed condition, when the measured Q/N ratio is above the established set point Q/N value. The Q/N ratio at surge for any given compressor has been found to be substantially constant. The values of both Q and N can be accurately measured, and hence the Q/N ratio can be used with a high degree of precision as a control parameter to avoid surge. Furthermore, because an acoustic flow meter or sonic velocity measuring device measures sonic velocity, said Q/N set point may be automatically biased to correct for sonic velocity and gas property changes; this providing a substantial improvement over existing compressor antisurge technology. In comparison to an acoustic flow meter, a sonic velocity measuring device is typically used in conjunction with a non-acoustic flow meter, for example a Venturi meter to obtain Q.

An acoustic flow meter is inherently beneficial in several respects. It is first an electronic instrument which directly measures the absolute velocity and sonic velocity of a gas, and hence with knowledge of the cross sectional area of the pipe through which the gas is being passed, it is but a simple matter to directly measure, or read, the actual cubic feet per minute (ACFM) of gas flow, or the rate of volumetric flow, Q, of the gas through the compressor. The compressor speed signal N can generally be generated by an electromechanical counter or magnetic pickup which senses pulses from a rotor mounted gear to provide a measured Q/N ratio which can be compared with the Q/N ratio set point at surge. Significant changes in the rate of flow of the gas, should they occur, can be picked up quickly and corrections made electronically by the logic system to compensate for the changed values of Q/N, both in terms of the set point condition and that at which surge will occur. Moreover, the acoustic flow meter can readily, and very rapidly, sense cessation of gas flow or gas flow reversal in the compressor, and hence used to open the recycle valve to avoid surge.

The characteristics of an acoustic flow meter, or sonic velocity measuring device measures the overall surge control system, the principle of operation of both, and the significance cf Q/N as a parameter for control of the system, will be more fully understood by reference to the following detailed description, and to the drawings to which reference is made in the description. The various features and components in the drawings are referred to by numbers, similar features and components being represented in the different views by corresponding numbers.

Figure 3:
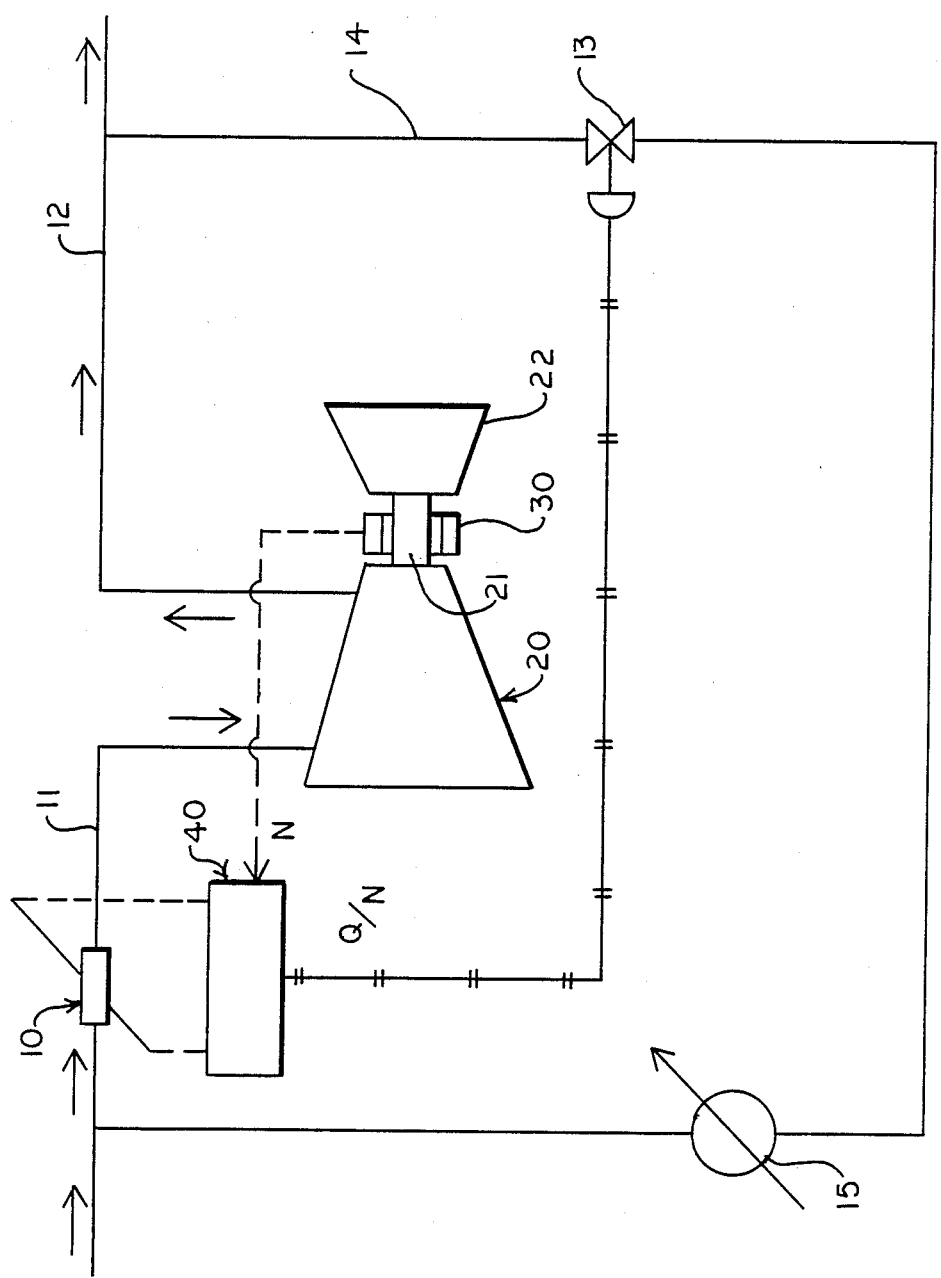

FIG. 3 schematically depicts the whole of the antisurge control system, inclusive cf the compressor, by pass surge control circuit, and electronic antisurge controller circuit.

Figure 1:
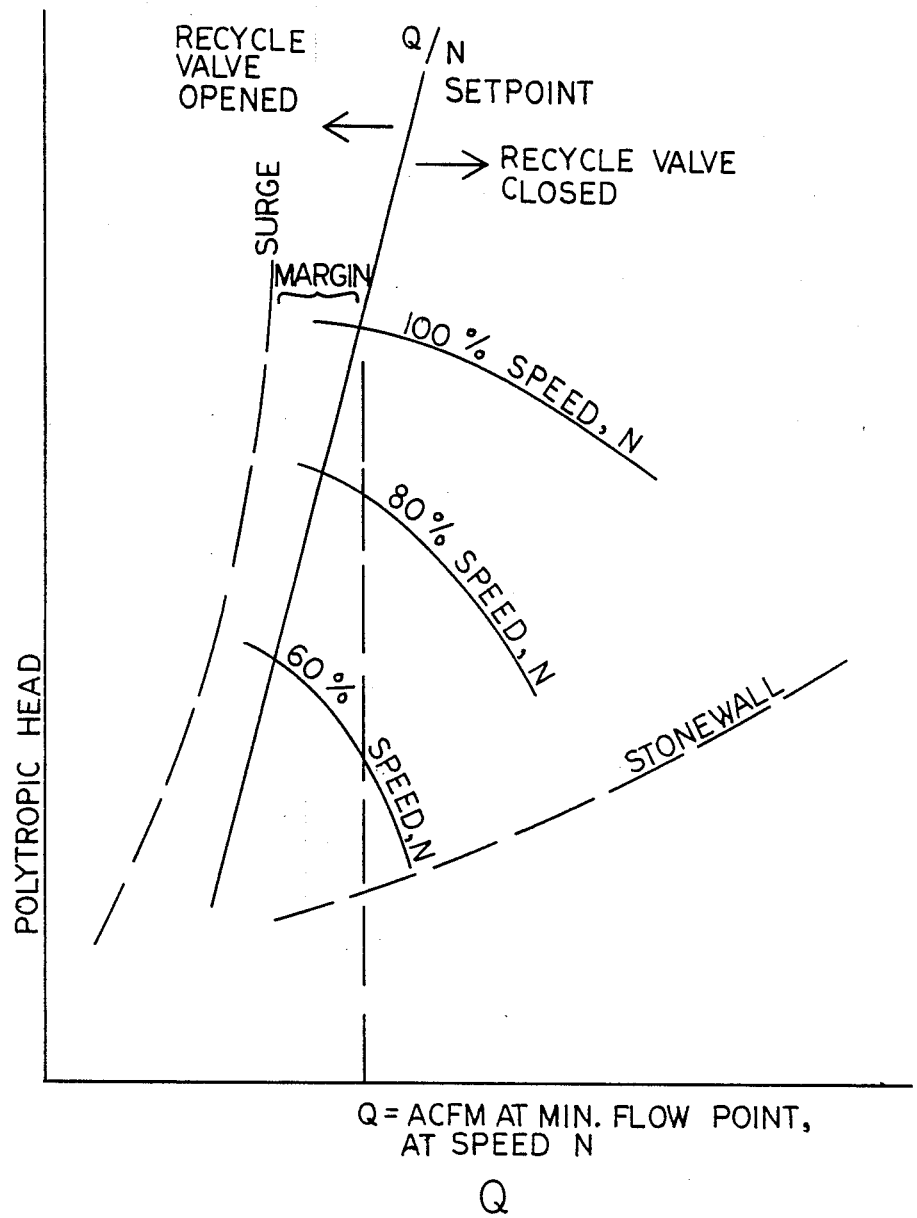
FIG. 1 depicts graphically a set of compressor parameters, particularly the Q/N parameter as controlling basis for detecting the onset of surges.

Referring to FIG. 1 there is graphically depicted a set of parameters which define centrifugal compressor performance, utilizing specifically the Q/N ratio as the controlling basis for the antisurge system of this invention; Q being defined as the actual cubic feet per minute (ACFM) of flow, and N as the speed of the compressor in revolutions per minute (rpm). One set of curves for polytropic head vs. flow can be generated for any given compressor. For a given compressor, the polytropic head can be plotted on the ordinate, and Q in terms of ACFM at minimum flow point at speed N can be plotted on the abscissa. The surge line, located to the left side of the figure, is shown as a dashed line extending from a location near the origin upwardly as a slightly bent, but almost straight line. It is a line generated from the locus of points defining the Q/N ratio at surge, and thus is an essentially straight line defining minimum flow conditions. The Stonewall line, to the extreme right side of the figure, is given as a dashed line; the surge line and Stonewall line defining the minimum and maximum limits of flow respectively. The area between the surge line and Stonewall line is that in which the compressor must be operated. The area to the left of the surge line will thus produce surge flow in the compressor and is thus to be avoided.

In accordance with the practice of this invention, a Q/N set point line can be drawn parallel and to the right of the surge line within the area between the surge line and the Stonewall line. The distance of the Q/N set point line from the surge line is dependent on the user desired safety factor. Thus, the controller is set to operate via the solid Q/N set point line, the exact point of which is dependent on compressor speed N. The locations for operation at 60%, 80% and 100% of maximum compressor speed in rpm are shown on the graph as areas intersecting the Q/N line at increasing polytropic head values between the surge line and Stonewall line. Changes in compressor speed N shift the set point of the controller upwardly along the Q/N line as compressor speed is increased, and downwardly along the Q/N line as compressor speed is decreased. Compressor parameters which cause shift of operating conditions to the left of the Q/N set point line product opening of a compressor controlled valve to recycle gas via a by pass line from the discharge side to the suction side of the compressor. Compressor parameters which cause shift of operating conditions to the right of the Q/N line closes the compressor controlled valve to cut off flow via the by pass line.

The distance of the Q/N set point line to the surge line is determined by the safety factor determined by the user. With existing anti surge controls, this safety margin is typically 10-20%. However with this invention, it is expected that a safety factor of only 5% would be required for most operations, due primarily to the accuracy, precision and reliability of the acoustic flow meter in directly measuring the volumetric flow to the compressor and the high precision attained with a speed input from the compressor. In addition, because the acoustic flow meter or sonic velocity measuring device measures sonic velocity, this parameter can be used to continually redefine the point of surge regardless of changes in molecular weight, temperature and pressure of the gas, this being a considerable improvement over existing anti surge controls which do not self compensate for such parameter. Considerable energy savings can be realized by minimizing gas recycle during low flow operation.

The acoustic flow meter and its mode of operation are best described by reference to FIGS. 2 and 3, first generally to the latter figure. The compressor circuit generally described by reference to FIG. 3 includes an inlet line 11 to the compressor 20, counter 30 for measuring the speed of the compressor, outlet line 12 from the compressor 20, and recycle line 14 inclusive of a regulator valve 13 and cooler 15. The compressor control circuit includes generally an acoustic flow meter 10 mounted across line 11, and controller 40 which through an electronic circuit controls the regulator valve 13.

The acoustic flow meter 10 is employed to measure the gas velocity and sonic velocity of the gas flowing through the compressor 20, which is output to the controller 40. Whereas the acoustic flow meter 10 can be mounted at the inlet side or outlet side of the compressor, it is preferably mounted at the compressor inlet represented by line 11, of which the cross section or inside diameter is known; the gas velocity and pipe cross section being used to calculate ACFM, or Q. When mounted at the inlet side of the compressor 20, the value determined by the acoustic flow meter 10 need not be corrected to indicate inlet conditions via mass flow output from the flow meter, and the inlet pressure and temperature of the gas to the compressor. The speed of the compressor, N, is determined by the counter, or meter 30, which reads the rpm of the shaft 21 driven by compressor driver 22 and inputs the value of N to the controller 40. The data output from the acoustic flow meter 10 to controller 40, which includes the value Q, coupled with the compressor speed, N, is used by the controller 40, to generate a Q/N ratio (flow in cfm/compressor speed) which has proven an extremely reliable control parameter for use in avoiding compressor surge. The Q/N ratio is compared by the system logic device, or controller 40, against the Q/N desired minimum ratio to regulate and control the opening and closing of the valve 13 of the by pass or recycle line 14 which extends from line 12 at the discharge side of the compressor 20 to line 11 at the suction side of the compressor 20. The Q/N desired minimum ratio is also corrected as a function of the sonic velocity means used by the acoustic flow meter 10.

Figure 2:
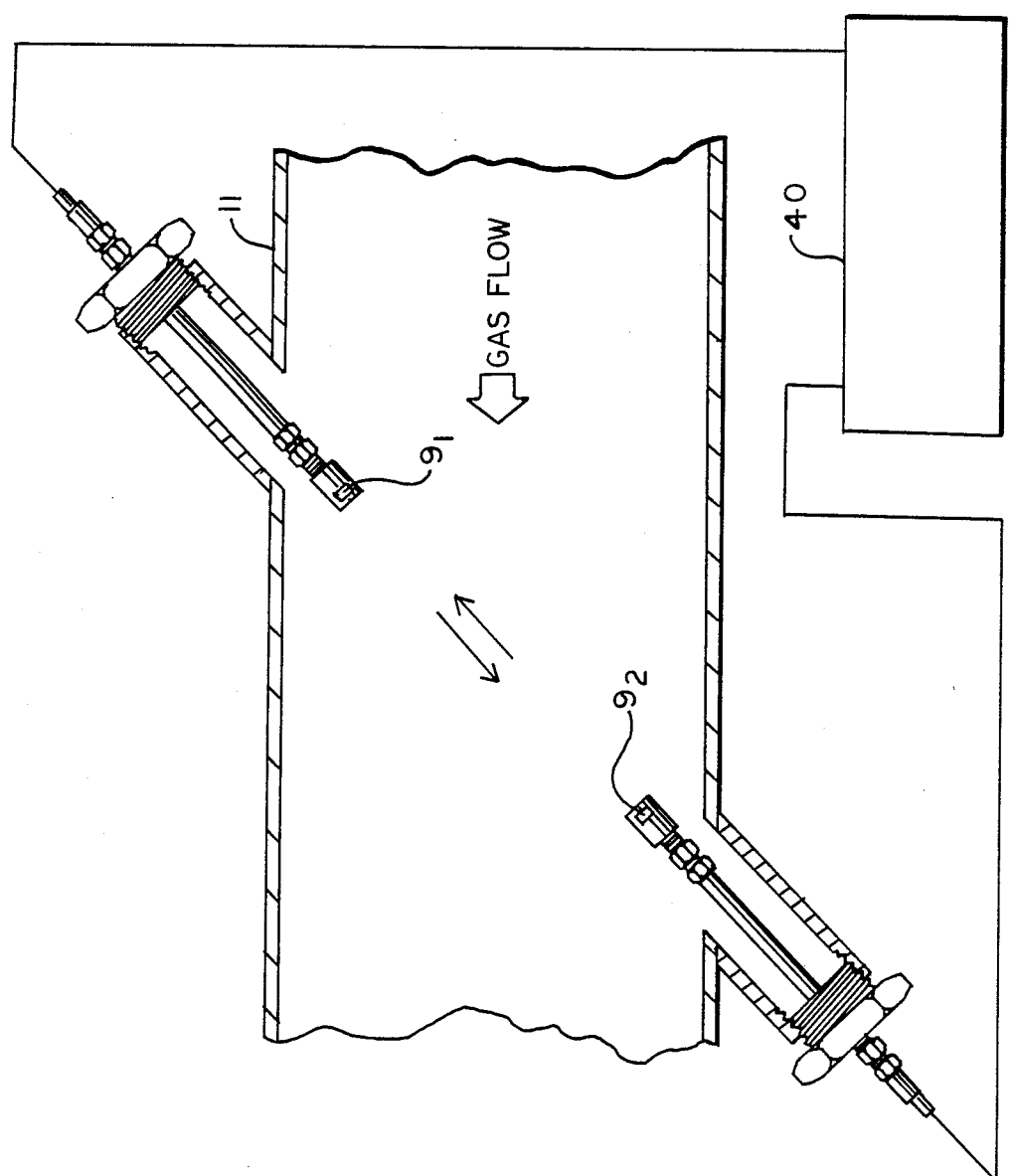
FIG. 2 depicts the acoustic flow meter component of the overall antisurge control system, and the manner in which it is used in the system.

Referring directly to FIG. 2, the principle of operation of the acoustic flow meter 10 is illustrated. Two piezoelectric transducers, or sensors $9_1$, $9_2$ are alternately mounted, one directly oppose of the other on two sides of the pipe, or line 11 located at the suction or inlet side of the compressor 20. The piezoelectric transducers 9 are each conveniently housed in a titanium body, or probe, and secured via stainless steel fittings to type 316 SS heavy walled tubing. The transducer ends are connected to a BNC connector at the end of the stainless steel tubing. In operation, a burst of acoustic pulses is sent alternately—e.g., at 100 cycles/second—between the two sensors $9_1$, $9_2$. Measurements are made in terms of the doppler effect principle. The difference between the two transit times, upstream and downstream across the line 11, is proportional to the gas flow velocity, regardless of the gas properties. Further, since sound speed depends on gas molecular weight, the average transit time implies the molecular weight of the gas (assuming gas specific heat ratio Cp/Cv, and gas compressibility z is known; or correlations can also be developed by gas analysis of molecular weight and speed of sound directly to eliminate any need of knowing Cp/Cv and z). The two measurements, differential transit time and average transit time, together with pipe diameter and flow characteristics can be used to indicate the flow velocity and the mass flow rate of the gas. The direct indication of flow velocity multiplied by the cross sectional area of the pipe or inlet line 11 through which the gas is passed, is readily translated into ACFM, or Q. The value of Q divided by compressor speed gives the value Q/N. Since in a given compressor the surge point is somewhat constant for a certain value of the parameter Q/N, the use of a signal based on this constraint inputted into the controller 20 offers significant advantages over the relatively complex control schemes currently in use. In addition, the measured sonic velocity can also be used to bias the Q/N set point at surge to make the device even more precise in correcting for changes in gas properties.

An acoustic flow meter useful in the practice of this invention is manufactured and marketed by Panametrics, of 221 Crescent Street, Waltham, MA 02254, viz. the Panametrics Model 7100 Ultrasonic Gas Flow Meter. A suitable gas flow meter of this type is disclosed in application Ser. No. 518,444, filed July 29, 1983, by Jack W. Smalling, Leonard D. Braswell, and Lawrence C. Lynnworth titled "*Apparatus And Methods For Measuring Gas Flow Parameters*", specific reference being made to Page 15, beginning at line 9, and continuing through Page 43, and to FIGS. 2 through 18, herewith incorporated by reference. [Refer to U.S. Pat. No. 4,596,133, which issued on June 24, 1986 to Smalling et al., specific reference being made to the descriptive material at Columns 7 to 21, and to the drawings (FIGS. 1 to 18) herewith incorporated and made part of the present application.] The Panametric Model 7100 is normally housed in a NEMA 4 enclosure (12"×15"×6") and requires 100 to 240 VAC; 50/60 Hz. Outputs include local digital display of user desired units, and up to three recorder outputs (4-20 mA) for flow velocity, sound speed and molecular weight (assuming Cp/Cv, z are known). Alarms are available for instrument failure, flow direction and flow rate.

The acoustic probes are attached to ½ inch diameter, thick wall, stainless steel tubes which are inserted in a 1 inch stainless steel pipe support barrel and through a packing gland into the pipeline. Various probe configurations are available to accommodate space limitations, but the preferred configuration is a 45° diagonal at mid radius. More than one source can be connected to a single instrument if desired, however coaxial wire lengths should be limited to 100 feet and each installation should have approximately the same acoustic path. Axial flow length can vary.

Again, specific reference is made to FIG. 3 which depicts a typical installation of an acoustic flow meter 10 employed to regulate a centrifugal compressor 20 for antisurge protection, as employed in this invention. In operation, process gas is provided to the compressor 20 via the line 11. Gas is discharged from the compressor 20 via the line 12. Gas can be recycled, if needed, from the discharge side to the input side of the compressor 20 via the valved line 14, the two terminal ends of which are adjoined to lines 11, 12, respectively. This is accomplished by opening the regulator valve 13 to permit flow of gas from the discharge side of the compressor 20 to the suction side of the compressor 20. The acoustic flow meter 10, installed in line 11 at the inlet side of the compressor 20, preferably in a straight section of the line at least about 10 pipe diameters upstream of the compressor 20, directly measures the ACFM and inputs this value to the controller 40. This value is coupled with the value N, the speed of the compressor, to derive the Q/N ratio. As depicted by reference to FIG. 1, when the Q/N value approaches the Q/N value at surge, i.e., the ACFM at minimum flow point at speed N, by movement to the left of the Q/N set point the controller 40, through electronic circuitry, opens the regulator valve 13 to permit flow of gas through recycle line 14 from the output side to the inlet side of the compressor. When the compressor circuit has been restabilized, and the Q/N value moved back to the desired set point the recycle line 14 is closed by action of the controller 40. In addition, if desired, internal biasing of the set point can also be made by the controller 40 to correct for those small changes in Q/N at surge associated with large changes in gas composition, this being via the measured sonic velocity, a parameter generated characteristic of the acoustic flow meter.

It is apparent that various modifications and changes can be made without departing the spirit and scope of this invention.

Having described the invention, what is claimed is:

1. In a method for controlling a compressor in which a control valve is employed in an electronic circuit to control the recycle of gas from the discharge outlet to the suction inlet to the compressor, the steps of:
  measuring the sonic velocity, that is the speed of sound in the gas, and the rate of volumetric flow, Q, of gas through said operating compressor,
  measuring the rate of speed, N, of said operating compressor,
  establishing a Q/N ratio from the values Q and N generated by the operating compressor,
  establishing a set point Q/N ratio based on a rate of gas flow above which compressor surge can occur, and
  comparing the Q/N ratio of the operating compressor with the Q/N set point ratio such that a measured Q/N ratio in the direction of a lower gas flow will open the control valve and permit the flow of recycle gas from the discharge outlet of the compressor to the suction inlet of the compressor, and return of the Q/N ratio of the operating compressor to the set point Q/N ratio will close the control valve to cut off the flow of recycle gas, wherein the Q/N set point ratio is constantly redefined based on measured gas sonic velocity during operation of the compressor.

2. The method of claim 1 wherein the rate of volumetric flow Q of gas through the operating compressor is established by direct measurement of the absolute velocity of the gas.

3. The method of claim 2 wherein the value measured for the sonic velocity of the gas is directly used for control of the control valve.

4. The method of claim 1, wherein the sonic velocity is measured with an acoustic flow meter.

5. The method of claim 1, wherein the sonic measuring device is used in conjunction with a non-acoustic flow meter.

6. In apparatus for operating a compressor to avoid surges wherein is included,
  a compressor through which a gas is flowed which has a suction inlet for the introduction of a gas into said compressor, for compression, and a discharge outlet for the removal of compressed gas from said compressor,
  a first line for supplying a gas to the suction inlet of said compressor,
  a second line for compressed gas from the discharge outlet of said compressor,
  a bypass line connecting said first line and said second line through which gas flow through said compressor to said compressor discharge outlet can be recycled to said compressor suction inlet,
  a control valve located in said bypass line which can be opened to recycle gas from said compressor discharge outlet to said compressor suction inlet, and closed to recycle gas from said compressor discharge outlet to said compressor suction inlet,
  an electronic circuit operatively associated with said control valve of said bypass line for opening and closing said control valve in response to an electronic signal,
  a controller operatively associated with said electronic circuit for regulating and control valve by opening and closing same, responsive to means for producing a signal representative of the flow rate of gas through said compressor on comparison with a set point representative of a gas rate minimum limit below which surge can occur,
  the improved combination which further includes,
  a flow meter located in a conduit of said compressor through which gas is passed to directly measure the absolute and sonic velocity, that is the speed of sound in the gas, and rate of flow, Q, of gas through said compressor, and input said value of Q to the controller,
  a means associated with said compressor for measuring the rate of speed, N, of the compressor and inputting said value to the controller,
  whereby the controller computes the Q/N ratio of the operating compressor and compares this value with a set point Q/N ratio representative of a gas flow rate minimum below which surge can occur to open the valve of the bypass line when the Q/N ratio of the operating compressor moves below the set point Q/N ratio in the direction of surge, and close the valve of the bypass line when the Q/N ratio of the operating compressor returns above the set point Q/N ratio and whereby the Q/N set point ratio is constantly redefined based on the measured sonic velocity of the gas during operation of the compressor.

7. The apparatus of claim 6, wherein said flow meter is an acoustic flow flow meter located in the inlet line which supplies gas to the suction of the compressor.

8. The apparatus of claim 6 wherein the acoustic flow meter is located in the outlet line which transports compressed gas from the discharge of the compressor.

9. The apparatus of claim 8 wherein the compressor is an axial flow compressor.

10. The apparatus of claim 8 wherein the compressor is a centrifugal flow compressor.

* * * * *